(12) United States Patent
Kruglick

(10) Patent No.: US 9,237,133 B2
(45) Date of Patent: Jan. 12, 2016

(54) DETECTING MATCHED CLOUD INFRASTRUCTURE CONNECTIONS FOR SECURE OFF-CHANNEL SECRET GENERATION

(71) Applicant: Empire Technology Development LLC, Wilmington (DE)

(72) Inventor: Ezekiel Kruglick, Poway, CA (US)

(73) Assignee: Empire Technology Development LLC., Wilmington, DE (US)

( * ) Notice: Subject to any disclaimer, the term of this patent is extended or adjusted under 35 U.S.C. 154(b) by 77 days.

(21) Appl. No.: 13/876,766

(22) PCT Filed: Dec. 12, 2012

(86) PCT No.: PCT/US2012/069292
§ 371 (c)(1),
(2) Date: Mar. 28, 2013

(87) PCT Pub. No.: WO2014/092702
PCT Pub. Date: Jun. 19, 2014

(65) Prior Publication Data
US 2014/0164768 A1    Jun. 12, 2014

(51) Int. Cl.
*H04L 9/32* (2006.01)
*H04L 29/06* (2006.01)
*H04W 12/02* (2009.01)
(Continued)

(52) U.S. Cl.
CPC .......... *H04L 63/0428* (2013.01); *H04L 9/0844* (2013.01); *H04L 63/062* (2013.01); *H04W 12/02* (2013.01); *H04L 63/1466* (2013.01); *H04W 12/12* (2013.01)

(58) Field of Classification Search
CPC . H04L 63/0428; H04L 9/0844; H04L 63/062; H04W 12/02
USPC ........................................................ 713/168
See application file for complete search history.

(56) References Cited

U.S. PATENT DOCUMENTS 4,325,129 A    4/1982 Groth
8,738,900 B2 *  5/2014 Battistello ...................... 713/155
(Continued)

OTHER PUBLICATIONS

International Search Report from International Application No. PCT/US12/69292 mailed Feb. 8, 2013.
(Continued)

*Primary Examiner* — Techane Gergiso
(74) *Attorney, Agent, or Firm* — Brundidge & Stanger, P.C.

(57) ABSTRACT

Technology is described for two parties, by leveraging previously established secure connections with third parties, to obtain a shared secret for generating a secure connection with each other in a way that reduces vulnerability to man-in-the-middle attacks. In some examples, the technology can include generating a session identifier; coordinating use of the session identifier by the two parties; finding an available secure communication channel to a third party; transmitting the session identifier to the third party via the available secure communication channel; receiving, via the available secure communication channel, a third party identifier and a session identifier-specific secret; sharing information about the received third party identifier; determining that the received third party identifier matches a third party identifier received by the second party; and using the session identifier-specific secret received with the matching third party identifier to generate a cryptographic key to secure communication between the two parties.

24 Claims, 7 Drawing Sheets

(51) Int. Cl.
*H04L 9/08* (2006.01)
*H04W 12/12* (2009.01)

(56) References Cited

U.S. PATENT DOCUMENTS

| | | | |
|---|---|---|---|
| 8,837,725 B2* | 9/2014 | Teruyama | 380/255 |
| 2006/0212270 A1* | 9/2006 | Shiu et al. | 702/188 |
| 2008/0137663 A1* | 6/2008 | Gu et al. | H04L 29/12594 370/395.3 |
| 2010/0064130 A1 | 3/2010 | Borisov | |
| 2011/0138458 A1* | 6/2011 | Kumar et al. | H04L 63/18 726/15 |
| 2011/0283110 A1* | 11/2011 | Dapkus et al. | G06F 21/577 713/182 |
| 2011/0302646 A1* | 12/2011 | Ronda et al. | 726/9 |
| 2012/0269346 A1 | 10/2012 | Best | |
| 2012/0272056 A1 | 10/2012 | Ganesan | |
| 2012/0310826 A1 | 12/2012 | Chatterjee | |
| 2013/0067552 A1* | 3/2013 | Hawkes et al. | H04L 63/166 726/7 |
| 2013/0086649 A1* | 4/2013 | Battistello | H04W 12/06 726/4 |
| 2013/0111209 A1* | 5/2013 | Harkins | H04L 9/321 713/171 |
| 2013/0138822 A1* | 5/2013 | Hu et al. | H04L 65/1069 709/227 |
| 2013/0308778 A1* | 11/2013 | Fosmark; Klaus S. | H04L 63/0823 380/270 |

OTHER PUBLICATIONS

R.J. Anderson, et al. "On Fortifying Key Negotiation Schemes With Poorly Chosen Passwords", University Computer Laboratory Pembroke Street, Cambridge CB2 3QG, Jun. 23, 1994, pp. 1-4, ISSN 0013-5194.
"Advanced sign-in security for your Google account," accessed at: http://googleblog.blogspot.in/2011/02/advanced-sign-in-security-for-your.html, posted on Feb. 10, 2011, pp. 1-7.
"BlueTooth Phone Vulnerability," accessed at: http://web.archive.org/web/20120501161946/http://www.acmetech.com/blog/2005/04/13/bluetooth-phone-vulnerability/, pp. 1-4, May 1, 2012.
"Diffie-Hellman key exchange," accessed at: http://web.archive.org/web/20120923212535/http://en.wikipedia.org/wiki/Diffie%E2%80%93Hellman_key_exchange, pp. 1-8, Sep. 23, 2012.
Anderson, R.J and Lomas, T.M.A. "On fortifying key negotiation schemes with poorly chosen passwords," Electronics Letters, vol. 30, Issue 13, pp. 1-4, Jun. 23, 1994.
"Universally unique identifier," accessed at: http://web.archive.org/web/20120529222452/http://en.wikipedia.org/wiki/Uuid, pp. 1-7, May 29, 2012.
Algesheimer, J. et al., "Efficient Computation Modulo a Shared Secret with Application to the Generation of Shared Safe-Prime Products," Advances in Cryptology—CRYPTO 2002 Lecture Notes in Computer Science, vol. 2442, pp. 1-17 (Mar. 6, 2002).
Bodik, P. et al., "Fingerprinting the datacenter: automated classification of performance crises," Proceedings of the 5th European conference on Computer systems, pp. 1-14 (Apr. 12, 2010).
Catalano, D. et al., "Computing Inverses over a Shared Secret Modulus," Advances in Cryptology—EUROCRYPT 2000 Lecture Notes in Computer Science, vol. 1807, pp. 190-206 (May 12, 2000).
Cluley, G., "SkyNET: DIY drone helicopter WiFi attacks for less than $600," accessed on: http://web.archive.org/web/20120926055336/http://nakedsecurity.sophos.com/2011/09/09/diy-drone-helicopter-wifi- attacks/, pp. 1-5, (Sep. 9, 2011).
Henderson, T., "Consider desktops in the cloud for BYOD," accessed at: http://web.archive.org/web/20121029135440/http://www.networkworld.com/reviews/2012/052112-desktop-as-a-service-test-259090.html, May 21, 2012, pp. 1-2.
McMillan, R., "New attack cracks common Wi-Fi encryption in a minute," accessed at: http://web.archive.org/web/20120115035920/http://www.networkworld.com/news/2009/082709-new-attack-cracks- common-wi-fi.html, Aug. 27, 2009, pp. 1-2.
Pash, A., "How to Crack a Wi-Fi Network's WPA Password with Reaver," accessed at: http://web.archive.org/web/20121211021108/http://lifehacker.com/5873407/how-to-crack-a-wi+fi-networks-wpa-password-with-reaver, Dec. 11, 2012, pp. 1-6.
Simmons, G. J., "Prepositioned Shared Secret and/or Shared Control Schemes," Advances in Cryptology—EUROCRYPT '89 Lecture Notes in Computer Science vol. 434, pp. 436-467, May 18, 2001.
Storm, D., "Brute force tools crack Wi-Fi security in hours, millions of wireless routers vulnerable," accessed at: http://web.archive.org/web/20120521124049/http://blogs.computerworld.com/19518/brute_force_tools_crack_wifi_security_in_hours_millions_of_wireless_routers_vulnerable, Jan. 4, 2012, pp. 1-3.
Varia, J., "Hosting Facebook Applications on Amazon EC2," accessed at: http://web.archive.org/web/20121029003455/http://aws.amazon.com/articles/1044, pp. 1-6, Oct. 29, 2012.

* cited by examiner

DETECTING MATCHED CLOUD INFRASTRUCTURE CONNECTIONS FOR SECURE OFF-CHANNEL SECRET GENERATION

CROSS-REFERENCE TO RELATED APPLICATION

This Application is the National Stage filing under 35 U.S.C. §371 of PCT Application Ser. No. PCT/US12/69292, filed on Dec. 12, 2012. The disclosure of the PCT Application is hereby incorporated herein by reference in its entirety.

BACKGROUND

When two parties do not know each other and are connected by an insecure channel, establishing secure communication between the parties is a challenge because of a risk that a third party can eavesdrop. A traditional way to overcome this challenge is to find a way for the two parties to share a secret in a way that does not reveal the secret to others (e.g., an eavesdropper, also referred to as an "adversary" or "attacker"). If the two parties have a shared secret, they can use it in accordance with various cryptographic protocols to generate encryption keys and authentication codes for secure communication.

Encryption is typically used to protect messages from being understood by unintended recipients, and authentication is used to ensure the integrity of the message and identify its sender. Some cryptographic schemes are based on symmetric-key ciphers, in which two parties encrypt and decrypt messages using a secret key that the two parties (and they alone) share. Symmetric-key encryption cannot begin, however, until the parties find a way to share or each generate the same secret key. If the parties try to share a secret key (or information used to mutually generate a secret key) over an insecure channel, they risk revealing their secret to an adversary. The adversary could be a passive eavesdropper or an active attacker who can pretend to be one of the parties, potentially intercepting and even modifying information sent between the parties.

Other cryptographic schemes are based on asymmetric or public-key encryption, in which each entity has a pair of keys, one public and one private; messages encrypted with one of those two keys can only be decrypted with the other. Asymmetric-key encryption, although generally more complex and slower than symmetric-key encryption, allows two parties to start communicating even when they have not shared a key in advance. The parties could even use an asymmetric encryption scheme to share symmetric encryption keys. To do so, though, each party needs to have the other party's public key, and needs to trust that the public key they are using actually belongs to the person they want to communicate with. If the two parties do not know each other and have not agreed on a trusted third party that can vouch for each party's identity (for example, a certificate authority used with digital signatures), they each risk communicating unknowingly with an adversary instead of the intended party.

A "man in the middle" attack occurs when a third party (e.g., an adversary) intercepts communications between a first and a second party that want to establish secure communication with each other, and pretends to each party that the attacker is the first or the second party. For example, if Alice wishes to exchange secret information with Bob, Mallory—the man in the middle—can foil their plans. Mallory intercepts a secret sent from Alice to Bob and, pretending to be Alice, sends a different secret to Bob; and then does the same in reverse for messages from Bob to Alice. Both Alice and Bob end up believing they have a secure channel to communicate with the other party, when they are actually each communicating securely with Mallory. Mallory can eavesdrop on the conversation; forward messages without alteration; or actively modify messages, fail to deliver authentic messages, and send false messages to either party.

Thus, a man-in-the-middle attack can completely compromise security when two parties try to initiate secure communication over an insecure channel, enabling an attacker to gather login credentials, credit card information, and other sensitive data. Many communications channels, especially wireless communications, are insecure—from public Wi-Fi wireless networks to Bluetooth connections to malicious cell phone transmitters that capture and forward data. It is remarkably cheap and increasingly easy for malicious actors to launch man-in-the-middle attacks on such networks using tools such as briefcase attack kits, "Bluetooth rifle" antennas that enable an attacker to eavesdrop on "short range" radio communications from a kilometer away, and even an unmanned aerial vehicle (UAV or "drone") equipped for Wi-Fi cracking. At the same time, the need for secure communications is evident in many contexts, whether the parties are individuals, merchants, or even application code. Therefore, finding a way to establish secure communications over insecure channels that is less vulnerable to man-in-the-middle attacks remains an important challenge. Unless otherwise indicated herein, the materials described in this section are not prior art to the claims in this application and are not admitted to be prior art by inclusion in this section.

SUMMARY

Technology is described for two parties, by leveraging previously established secure connections with third parties, to obtain a shared secret for generating a secure connection with each other in a way that reduces vulnerability to man-in-the-middle attacks. In various embodiments, the technology includes generating a session identifier; coordinating use of the session identifier by the first party and the second party; finding an available secure communication channel to a third party; transmitting the session identifier to the third party via the available secure communication channel; receiving, via the available secure communication channel, a third party identifier and a session identifier-specific secret; sharing, by the first party, information about the received third party identifier with the second party; determining that the received third party identifier matches a third party identifier received by the second party; and using the session identifier-specific secret received with the matching third party identifier to generate a cryptographic key to secure communication between the first party and the second party.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
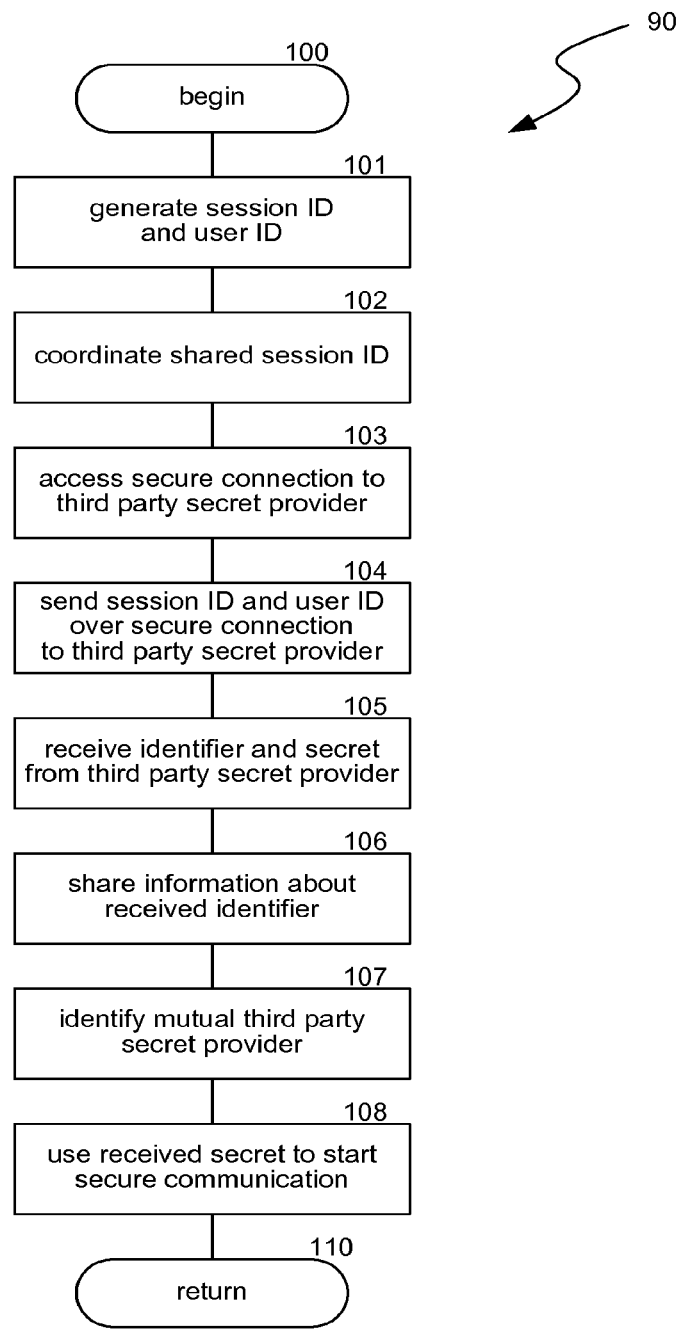
FIG. 1 is a flow diagram illustrating a routine typically performed by some embodiments of the technology to obtain a shared secret for starting secure communication with another party.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is disclosed for obtaining a shared secret to generate a secure connection between two parties by leveraging previously established secure connections with third parties ("the technology"). The technology takes advantage of the fact that many applications (or "apps") and service providers share underlying datacenters and that communication within those datacenters is outside the reach of the typical connection attacker. By using established secure links between apps and datacenters to transmit secret information from the datacenter to the user, and publicly comparing only data about what datacenter the secret came from, two users can develop a shared secret while only publicly sharing data that is useless to an attacker. In an increasingly network-connected computing world in which cloud computing services are growing in ubiquity, many users have existing secure connections to one or more cloud services or other online service providers. The technology enables such users to form secure connections with other users and merchants, and enables apps to connect securely to other apps and web pages, e.g., in a way that reduces vulnerability to man-in-the-middle attacks.

The technology provides security for two-party communication with minimal overhead and counters a common form of connection attack. Unlike existing virtual private network (VPN) systems that require the two parties to be pre-established members of the same privilege groups (e.g., users in the same company or connected to the same university) who know up front that both parties have access to the VPN in order to communicate, the technology enables unrelated users who simply have a datacenter in common to establish secure communication.

Many users of mobile devices have similar mobile apps or mobile apps that communicate with common datacenters. The technology enables, for example, any two Apple® customers with iCloud® connections, or any two smartphone users who have at least one app that is based in Amazon® datacenters, to identify their mutual service provider and obtain information from that service provider that enables them to start communicating securely even when the channel is insecure and the two parties do not have any previously shared secrets. The technology does not require any user to be a member or user of a particular application, to have a pre-existing connection to the communication target, or to have a particular login or provide any login information (especially over an insecure network) at the time of connection.

Examples of the types of secure channel to be made between the two parties include peer-to-peer connections (e.g., between two users who wish to share media or play a game together), client-server connections (e.g., to download a web app), connecting with a merchant or ATM, and application-to-application connections within a device (e.g., for a newly installed app to leverage the connections of another app to allow it to securely register). The technology enables users to leverage existing secure connections (including especially secure connections, e.g., services requiring multiple factor authentication for access and virtual desktop interfaces) to form other secure connections. The leverage, however, is one way: any compromise of the newly established link (for example, if an app itself is malevolent) does not affect the original secure connection in any way because the secret delivered is of no significance to the pre-existing link.

In some embodiments of the technology, a third party service provider, e.g., a datacenter, offers an application programming interface (API) through which it responds to a request for a secret. As an example, an API accepts securely communicated requests including a user identifier (or "ID") and a session ID of some form, and returns (also by secure communication) a datacenter ID of some form and a secret. The user ID, session ID, datacenter ID, and secret are discussed in further detail below. For the secret to serve as a useful basis for starting secure communication between two parties who each have individual user IDs and who together share a single session ID, in some embodiments, the datacenter returns the unique pair of datacenter ID and secret only once per user ID and only twice per session ID. In some embodiments, the technology provides the unique pair of datacenter ID and secret a greater number of times, enabling more than two parties to share a secret usable for starting secure communication. For example, an API accepts requests including an additional parameter for the total number of participants and sends an alert to each requestor if the number of user IDs requesting a secret exceeds that number.

In some embodiments of the technology, a user's computing device, e.g., a mobile telephone, contains at least one app, operating system service, or other component that has access to a third party service provider's API for requesting a secret, and offers that access to programs on the computing device. For example, a component (e.g., an application "Activity") on a device running an Android™ operating system can register its availability to service "Intent" message objects that send the component data (e.g., as XML structured data). Commonly encountered examples of Intents are share menus or the option to send data from one application to another (e.g., to handle a URL link by invoking a browser application).

Mobile operating systems and at least most desktop operating systems have a mechanism for apps to offer a standardized interface for apps to exchange data. Such system level access can be offered by each app, and can be provided to app writers in code libraries or even made available to apps by the operating system. When the system receives an Intent querying a third party secret-request API, the Intent is directed to be handled by such a registered component. In some embodiments, multiple components handle a request for a securely transmitted secret from a third party, resulting in the requestor receiving multiple datacenter ID-and-secret pairs (e.g., one pair from each component that contacted a third party service with an API for secret requests).

Such components, using established secure connections, securely transmit a session ID and a user ID to the third party and securely receive a datacenter ID and a secret in response. Once at least one response has been received, the technology transmits the received datacenter ID, or information about it, so that the two parties can determine whether they have each securely obtained a secret from a mutual third party. If the two parties compare the received datacenter identifiers and identify a matching identifier, then they know that they each communicated with one service provider through a secret-requesting API, sending the same session ID and receiving the same datacenter ID and secret in response. Thus, if the parties' datacenter IDs match, so do their secrets. Their secret is known only to the two parties and to the third party service that provided it; and it is only transmitted over a secure link and is not revealed. Then, once the two parties have a shared secret, they can use it to initiate secure communications between them.

Several embodiments of the technology are described in more detail in reference to the Figures. FIG. 1 is a flow diagram illustrating a routine 90 typically performed by some embodiments of the technology to obtain a shared secret for starting secure communication with another party. The routine 90 begins at block 100. In blocks 101-102, the technology establishes a shared session identifier. In block 101, the technology generates a practically unique session identifier and a practically unique user identifier. The session identifier is both arbitrary and temporary; therefore it can include meaningless numbers, e.g., a randomly generated 128-bit universally unique identifier (UUID). Means for generating a session identifier include, e.g., a random (or pseudo-random) number generator, a UUID generator, or a hash function. Algorithms for generating session identifiers are generally known in the art. Because the session identifier need not represent any "real" information that could identify a party and is useful only for a moment, it can be transmitted over insecure networks.

A user identifier does not need to be disclosed over an insecure channel, so it can, like the session identifier, be random and ephemeral, or it can convey actual information identifying its associated party. Means for generating a random user identifier can be the same as means for generating a session identifier; means for generating a less random user identifier include, e.g., use of a network interface Media Access Control (MAC) address, an email address, telephone number, real-world or physical address data, or a username, or transformation of such data including addition of an increment or a timestamp, or hashing such data.

In block 102, the technology coordinates use of a session identifier between the two parties who wish to initiate secure communication but have no shared secret information and only insecure avenues of communication. In various embodiments, the technology entails at least one party transmitting a session identifier or information about a session identifier.

Means for deciding on a shared session identifier include, e.g., letting the requestor (e.g., the first party to initiate the process or propose a session identifier) choose a session identifier, letting the respondent (e.g., the second party) choose, taking the session identifier generated by the party with the lowest or highest MAC address, or combining identifiers chosen by both parties.

In some embodiments, session IDs are not arbitrary, but conform to a protocol known to both parties (e.g., a concatenation of their addresses and the date, or a hash or other transformation of information unique to the parties and verifiable and available to both). Such session IDs reduce the risk of a man-in-the-middle attack by preventing an attacker from spoofing insecure transmission of a session ID. For example, there is a risk that when Alice proposes a session ID to be shared with Bob, Mallory intercepts the communication—so that Alice and Bob think they have one session ID for communication with each other, when in fact they have different session IDs and each ends up having a "secure" session with Mallory. If Alice and Bob can establish a session ID without either one having to transmit a proposed session ID (or information for selecting a session ID), it becomes much more difficult for Mallory to mount a man-in-the-middle attack.

If an attacker can pre-compute a session ID (or even a huge number of potential session IDs) and has substantial datacenter connections, the attacker could potentially mount an attack at the point of requesting a secret from datacenters, by racing the parties to obtain a secret and then pretending to be one of the parties. This potential attack, however, is limited because only one party can be duped; the other party, excluded from the conversation, becomes aware of the attack (although the attacker could mount a simultaneous denial-of-service (DoS) attack on the excluded party). This weakness can be mitigated by enhancing the datacenter API protocol to not only provide the secret only twice for each session ID but also to notify recipients of the secret if the datacenter receives secret requests from more than two users.

In embodiments illustrated by FIG. 1, a third party offers an API to generate secrets, e.g., as a datacenter service, via a software-as-a-service (SaaS) application, or by another local provider. In block 103, the technology accesses at least one such API by locating a component, object, application, or service that has a secure link to such a third party secret provider. Means for locating a secure communication channel to a datacenter or other third party secret provider include, e.g., sending an Intent message object in an Android™ system (or using equivalent messaging objects or protocols in other operating systems); making a function call to a registered API (e.g., an operating system service); identifying resident applications known to make encrypted cloud server connections, e.g., Dropbox™, Apple® (iCloud®), Google® services (e.g., Google Play™), Microsoft® (e.g., Skydrive®, Xbox LIVE®), Box.net®, Amazon® (and Amazon®-hosted applications), Rackspace®, or Facebook®; or maintaining at least one datacenter-resident app to support the technology. Means for communicating with an app having a secure connection to a third party secret provider include, e.g., standard HyperText Transfer Protocol (HTTP) GET or POST requests sent over TCP/IP network connections; Extensible Markup Language (XML) or JavaScript Object Notation (JSON) data provided by Representational State Transfer (REST or RESTful) or Simple Object Access Protocol (SOAP) services; and inter-application messaging protocols within an operating system. Existing secure links include any application connection or cloud service connection that has already been established securely; persistent connections typically engage in various token and key processes to be able to re-establish secure connections (e.g., authenticated and encrypted messaging) over even unsecure Wi-Fi based on previous authorizations and a continuous chain of secrets.

In block 104, the technology sends the generated user identifier and the shared session identifier over a secure connection to one or more third party secret providers. Means for securely transmitting the shared session identifier and receiving a third party identifier and secret in response include communicating via the secure communication channel, e.g., using HTTP Secure (HTTPS), Transport Layer Security (TLS) or Secure Sockets Layer (SSL), Secure Shell (SSH), Secure/Multipurpose Internet Mail Extensions (S/MIME), Pretty Good Privacy (PGP), or other encryption over a wired or wireless network connection.

Each third party secret provider, having received a unique user identifier paired with a session identifier received no more than twice in total, responds by generating a third party identifier and a secret. (Note that one party cannot wind up with both available copies of the third party identifier/secret pair because the third party secret provider replies only once to each unique user identifier; and no more than two parties can receive the same third party identifier/secret pair because the third party secret provider replies only twice to each session identifier.) In some embodiments, the third party secret provider is a datacenter, and the identifier is generated using datacenter-specific fingerprinting or identification, producing, e.g., an anonymized hash of the datacenter's identity. The third party identifier, much like the session identifier, serves to help the two communicating parties find a shared third party secret provider and does not need to convey meaningful information; it can be an apparently random identifier. In block 105, the technology receives, by secure communication, the identifier and secret from the third party secret provider.

In blocks 106-107, the technology shares information about the received third party identifier and identifies a mutual third party secret provider, e.g., a third party secret provider to which both parties sent a user identifier and session identifier and from which both parties received the same third party identifier and secret. The technology maintains the security of the secret and in block 106 transmits the third party identifier or information about the third party identifier over insecure connections. Means for sharing the third party identifier or information about the received third party identifier over an available insecure communication link (which may be local or remote, wired or wireless) include, e.g., one party transmitting a third party identifier that the other party verifies, both parties transmitting a received third party identifier and verifying a third party identifier transmitted by the other party, each sending part of a third party identifier and both verifying a match (sequentially or concurrently), or hashing a third party identifier (on its own or with additional data) and verifying that the hashes match or are as expected. Means for determining that two third party identifiers match include, e.g., string comparison, numeric comparison, or verification of information about the third party identifiers or of operations performed on the third party identifiers.

In block 107, when the two parties discover a matching third party identifier that they have each received, they know that each party's secret associated with the third party identifier also matches (and that no other party has received the same third party identifier and secret from the secret provider). After the two parties have identified at least one shared secret provided by a mutual third party secret provider, they can in block 108 start the process of creating a secure connection (e.g., by each generating, based on the shared secret, an identical symmetric key for encryption or authentication). With a shared encryption key, the first party and the second party can encrypt communication between them.

Means for generating a cryptographic key using the secret can include, e.g., applying the secret to a Diffie-Hellman-Merkle key exchange protocol to detect a man-in-the-middle attack as described in further detail in connection with FIG. 8 below, or by key stretching; password-authenticated key agreement (e.g., DH-EKE, SPEKE, or J-PAKE) using the secret as the password; applying a key derivation function (e.g., PBKDF2 or scrypt) utilizing a cryptographic hash function (e.g., SHA-3, SHA-256, AES, 3DES, MD5, Blowfish, HMAC, etc.) to the secret or to the secret plus an standard or agreed salt (e.g., both user names concatenated, the current time, etc.) over a standard or agreed number of iterations to produce a cryptographic key (symmetric, asymmetric, elliptic curve, etc.), message authentication code (MAC) or authenticated encryption; or using the secret itself as a key or as a one-time pad.

The routine 90 returns at block 110. Those skilled in the art will appreciate that the logic illustrated in FIG. 1 and described above, and in each of the flow diagrams discussed below, is only provided as an example and may be altered in various ways. For example, the order of the logic may be rearranged, subactions may be performed in parallel or combined into fewer operations, illustrated logic may be omitted, other logic may be included, etc., without detracting from the essence of the disclosed embodiments.

Figure 2:
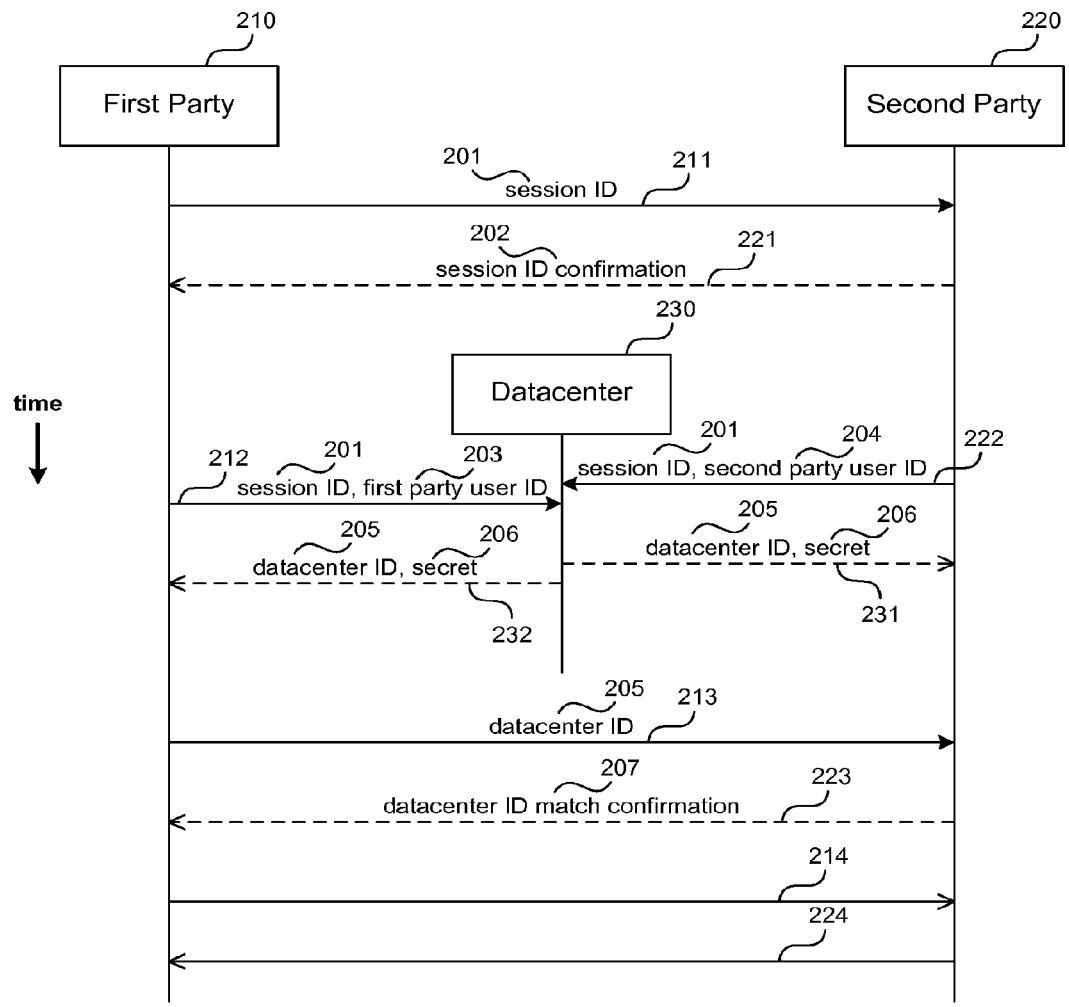
FIG. 2 is a sequence diagram illustrating communication between a first party, a second party, and a datacenter in accordance with some embodiments of the technology.

FIG. 2 is a sequence diagram illustrating communication between a first party 210, a second party 220, and a datacenter 230 in accordance with some embodiments of the technology. The first party 210 sends a session ID 201 to the second party 220 in a message 211. The second party 220 replies in message 221 with an acknowledgment or a confirmation 202 of the session ID 201 which, once confirmed, becomes a "shared session ID." In a secure message 212, the first party 210 sends the shared session ID 201 and a first party user ID 203 to the datacenter 230; in a secure message 222, the second party 220 sends the shared session ID 201 and a second party user ID 204 to the datacenter 230. The datacenter 230 replies both to the second party 220 and to the first party 210 in secure messages 231 and 232, respectively, each of which contains a datacenter ID 205 and a secret 206. The first party 210 sends in a message 213 the datacenter ID 205 to the second party 220. The second party 220 replies in a message 223 with a confirmation 207 that the datacenter ID 205 of the message 213 (which the first party 210 received from the datacenter 230 in the secure message 232) matches the datacenter ID 205 that the second party 220 received (specifically, the datacenter ID 205 that the second party 220 received from the datacenter 230 in the secure message 231). The parties then exchange secure (e.g., encrypted) messages 214 and 224.

It is instructive to consider the results of various attack strategies against the technology. An attacker unable or unwilling to connect with the same third party secret provider with which the two parties communicate will see only the information they transmit over insecure channels: first a temporary session identifier, and then one or more third party identifiers. Each such piece of information is effectively a random string of data. Then, when the parties' communication starts, both parties—and not the attacker—have a shared secret and the attacker is blocked from observing or modifying their encrypted messages, leaving the communication secure.

An attacker with substantial third party secret provider connections (which is a detection risk for the attacker) can attempt to send an intercepted session identifier to the third party secret providers. Since each third party secret provider will only give out an identifier-and-secret pair twice in response to a given session identifier, this generates a race condition at each third party secret provider between the attacker and the users. If both of the two legitimate parties get answers first, then they win and have a secure third party identifier and secret and can again eject the attacker by establishing a secure connection. Any third party secret provider at which the attacker beats at least one of the parties results in a spoiling: only one party can get the third party identifier/secret pair, so no third party identifier match occurs between the parties on any secret the attacker manages to get. Thus the attacker can only spoil connection attempts, and would have to win the race to all matching third party secret providers to spoil the connection overall—even one success by the parties allows them to establish a secure connection. In various embodiments, the technology offers different tiers or strengths of security. For example, a third party secret provider may choose to provide an identifier-secret pair more than twice for a particular session identifier, which may allow the two parties to more quickly find a shared secret provider (e.g., if one party has multiple secure channels to the secret provider with different bandwidths, communication speeds, latencies, response times, or processing times, that party may receive a later-sent copy of the secret before an earlier-sent copy), at the cost of a lower security connection.

Figure 3:
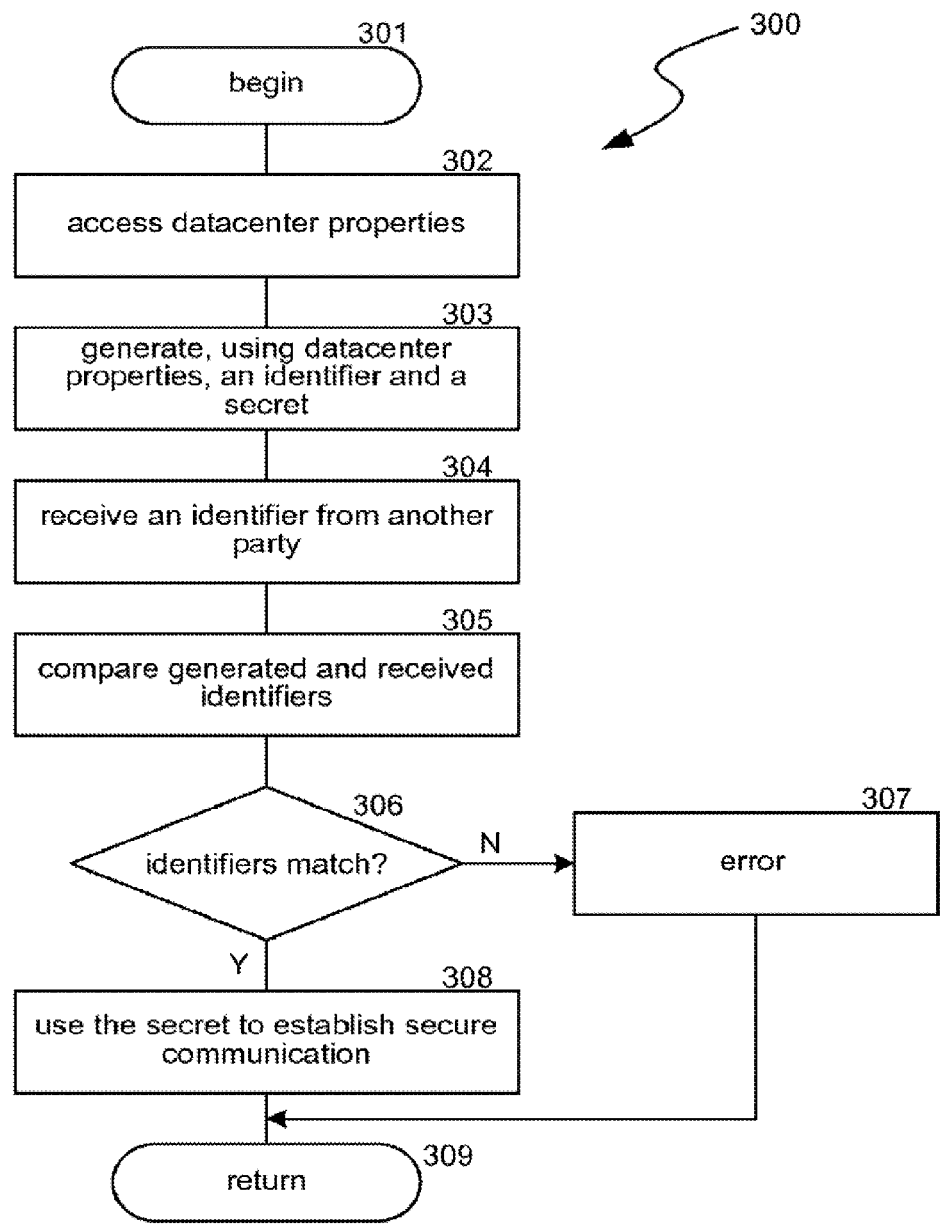
FIG. 3 is a flow diagram illustrating a routine typically performed by some embodiments of the technology to obtain a shared secret for starting secure communication with another party when the third party is a datacenter that does not offer an API for requesting secrets.

FIG. 3 is a flow diagram illustrating a routine 300 typically performed by some embodiments of the technology to obtain a shared secret for starting secure communication with another party when the third party is a datacenter that does not offer an API for requesting secrets. In that case, any datacenter resident—e.g., a software application or service operating on computing devices within the datacenter, or computing hardware located within the datacenter—or any party with a connection to a datacenter resident, can achieve the same goal by generating a pair of hashes that is representative of the particular datacenter and then using one as the identifier and the other as the secret. As long as the same result will be achieved by any resident within the same datacenter, the technology works in fairly similar fashion.

The routine begins at block 301. In block 302, a datacenter resident party accesses datacenter properties. Datacenters typically do not hide such data because applications are presumed to be largely able to tell which datacenter they are connected with (e.g., from addressing). Examples of such datacenter properties include machine load states, traffic levels, and other datacenter-level metrics that can be broadly tracked by applications deployed in that datacenter. Peter Bodík, for example, proposed a datacenter-wide fingerprint to characterize overall datacenter state at the time of a failure, so that failures can be judged by their similarity to previous failures in order to facilitate faster recovery. (P. Bodík et al., "Fingerprinting the Datacenter: Automated Classification of Performance Crises," in Proceedings of the 5th European conference on Computer systems (ACM, 2010), 111-124.) Datacenter properties may be as basic as address or location details. Another possible source of datacenter identifying data is API tests within the datacenter: most different datacenters support different APIs and have different speeds of response to those APIs that are supported, but the results within a datacenter will be uniform.

In block 303, the party generates a datacenter identifier and a secret based on one or more of the datacenter properties. In some embodiments, the party performs a hash function on the accessed properties. Generating both a shared datacenter identifier and secret in this fashion can be as simple as multiple applications recording the address of their datacenter and an agreed upon state value such as congestion signals and then using one hash function (e.g., MD5) to generate the comparison hash and another hash function on the same data (e.g. AES-256) to generate the secret. Thus, very little initial data is needed for two applications in the same datacenter to generate hash/secret pairs. In some embodiments, such a hash is time varying and specific to a physical datacenter. Thus, while Bodík promoted a datacenter fingerprint for recording state around failures (to recognize when those failures might happen again), such fingerprints represent a continuously varying data signature that is particular to a datacenter but at least partially visible to different apps within the datacenter.

In block 304, the party receives a datacenter identifier from another party, and in block 305 the party compares the generated datacenter identifier with the received datacenter identifier. At decision block 306, the routine determines if the datacenter identifiers match. If they match, then the secrets also match; and at block 308 the routine indicates to the parties to use the secret to establish secure communication. Otherwise, an error may be reported at block 307. After either blocks 307 or 308, the routine returns at block 309. Depending on the method and data used for generation, the datacenter identifier and secret may not be very complex. Although hash-created identifiers and secrets based on datacenter data signatures are stronger for more complex data, even a small shared secret allows two parties to exchange increasingly complex compressed keys until desired bit depth of security is reached.

The embodiments illustrated by FIG. 3, in which each party generates its own datacenter identifier and secret, may be unable to limit their generation to a maximum of two parties unless both parties have the same application. Thus, such embodiments can be vulnerable to an attacker who is listening and willing to bombard applications with key requests. Such an attacker can be defeated if both users have at least one datacenter resident in common (e.g., a common mobile app) or if they share at least one app that is coordinating with an app used by the other. If, for example, just Apple® (via iCloud®) and Google® (via Google Play™ or other services) cooperate on an arrangement in accordance with such embodiments of the technology, then even an attacker willing to be highly visible will be defeated and any two Android™ and/or iOS® users will be able to establish secure links.

The potential reach of the technology is enhanced by the frequency of datacenter overlap. First, any two users of products from Microsoft®, Apple®, or Google® who are located anywhere near each other almost certainly share datacenter connections. Those connections are migrated among a relatively small number of datacenters to be near the users. In many cases connections are maintained with multiple datacenters of a single company (e.g., Google®) at once, increasing the chances of overlap. Additionally, any apps deployed using the Google App Engine™ will come from those same datacenters so Google® will also connect with many iOS® users (e.g., iOS® users who have an app from Google® or an app deployed using the Google App Engine™). Facebook®, too, can be found on phones of all operating systems, and uses a relatively small number of datacenters. Amazon® and Rackspace® again use a relatively small number of datacenters to host thousands of applications, including many Facebook® applications. Thus, any two users of the same operating system likely have a suitable datacenter connection, as would any two Facebook® users whatever their operating system. Likewise, any two users who among them have at least one Dropbox™ account (based on Amazon® servers) and any other application that uses Amazon® (including many Facebook® apps).

In some embodiments of the technology, a datacenter operator unifies servicing of a secret-requesting API call across multiple datacenters so that instead of returning a datacenter-specific identifier it returns an identifier shared by, e.g., all Facebook® datacenters, which thus matches for communication between parties connected to any Facebook® datacenter. In some embodiments, the technology is made even more powerful by having a few big participants in the datacenter ecosystem collectively service such calls, taking the session ID and responding with a secret and a unified secret-provider identifier established across secure inter-datacenter connections.

Figure 4:
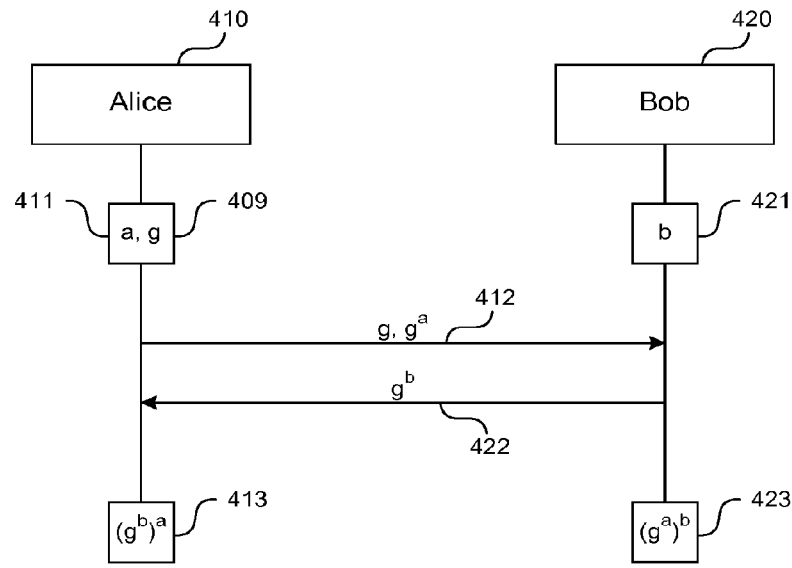
FIG. 4 is a sequence diagram illustrating a simplified typical Diffie-Hellman-Merkle key exchange in accordance with some embodiments of the technology.
Figure 5:
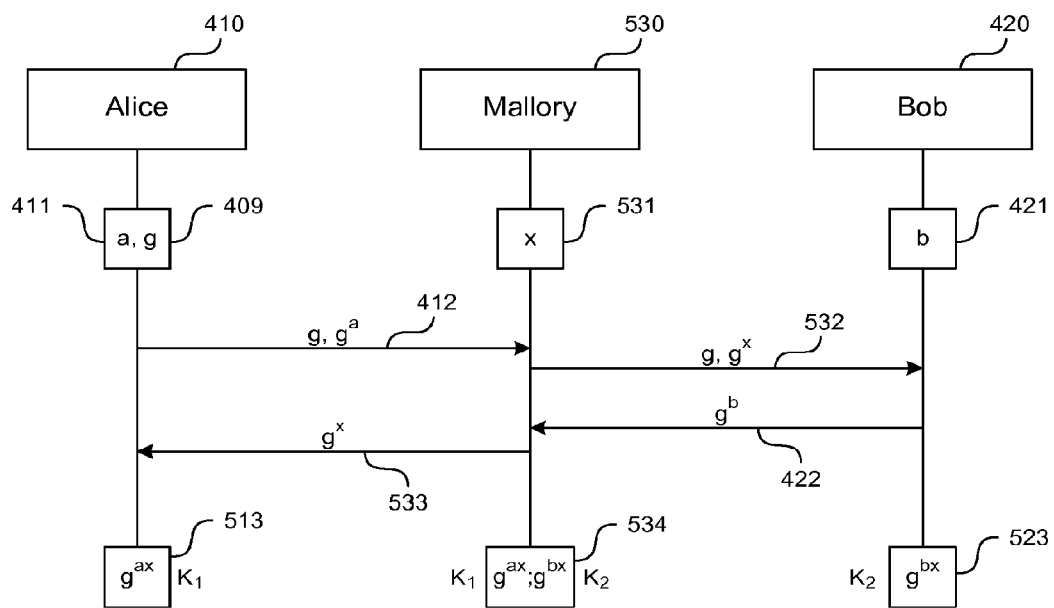
FIG. 5 is a sequence diagram illustrating a man-in-the-middle attack on a Diffie-Hellman-Merkle key exchange in accordance with some embodiments of the technology.
Figure 6:
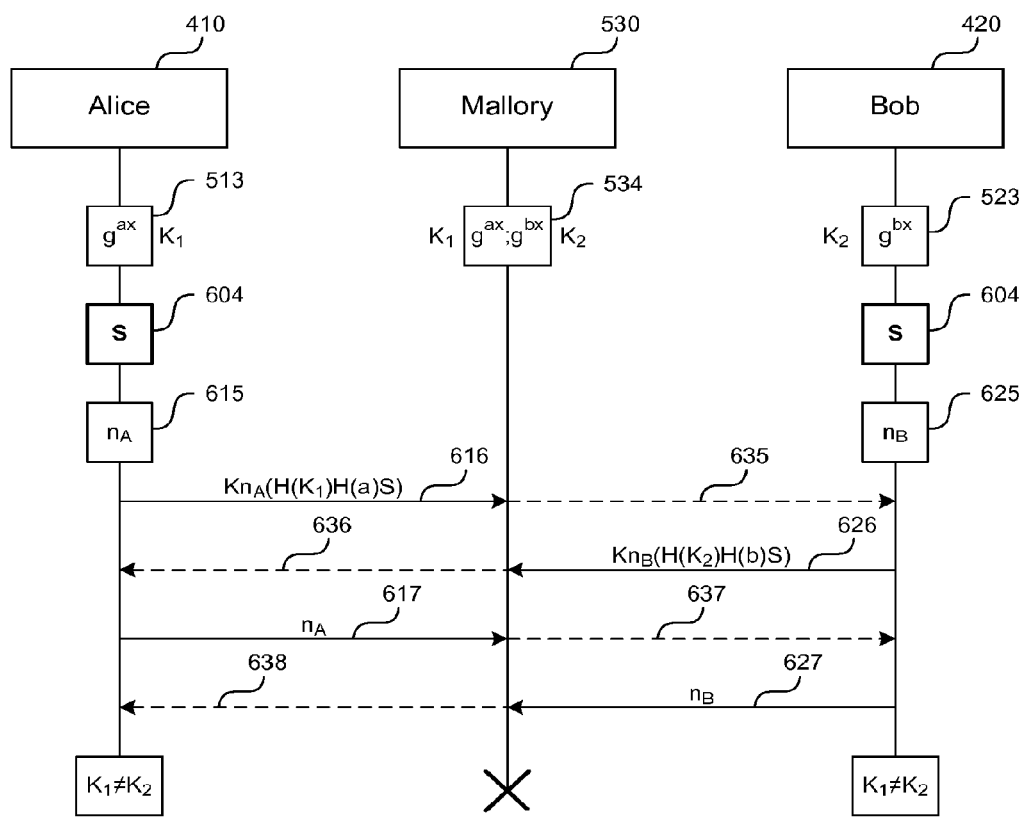
FIG. 6 is a sequence diagram illustrating a use of a shared secret obtained in accordance with various embodiments of the technology to detect the man-in-the-middle attack of FIG. 5.

FIGS. 4, 5, and 6 illustrate uses of the technology to defeat a man-in-the-middle attack. FIG. 4 is a sequence diagram illustrating a simplified typical Diffie-Hellman-Merkle key exchange in accordance with some embodiments of the technology. Alice 410 and Bob 420 each pick a private exponent a 411 and b 421, respectively, and Alice 410 also picks a public base ("generating element") g 409. In a message 412, Alice 410 sends Bob 420 both g and $g^a$. In a message 422, Bob 420 sends Alice 410 $g^b$. Alice then computes $(g^b)^a$ 413 and Bob computes $(g^a)^b$ 423, and both parties end up with a shared key $K=g^{ab}$.

FIG. 5 is a sequence diagram illustrating a man-in-the-middle attack on a Diffie-Hellman-Merkle key exchange in accordance with some embodiments of the technology. In addition to Alice 410 and Bob 420, now present is a man-in-the-middle attacker Mallory 530. Mallory 530 pretends to be Bob 420 to Alice 410 and pretends to be Alice 410 to Bob 420. As in FIG. 4, Alice 410 and Bob 420 each pick private exponents a 411 and b 421, respectively, and a public base ("generating element") g 409. In a message 412, Alice 410 sends both g and $g^a$ as before, but the message 412, intended for Bob 420, is intercepted by Mallory 530. Mallory 530 picks a private exponent x 531, and in a message 532 sends Bob 420 both g and $g^x$ (instead of $g^a$). In a message 422, as before, Bob 420 sends $g^b$, but to Mallory 530 rather than to Alice 410. Mallory 530 then sends Alice 410 $g^x$ in a message 533. Alice 410 then computes a key $K_1=g^{ax}$ 513, and Bob 420 computes a key $K_2=g^{bx}$ 523. Mallory 530 possesses both keys 534: $K_1$ 513 for posing as Bob 420 when communicating with Alice 410, and $K_2$ 523 for posing as Alice 410 when communicating with Bob 420. Mallory's 530 man-in-the-middle attack is successful: both Alice 410 and Bob 420 think they are communicating with each other, when in fact they are each communicating only with Mallory 530. Mallory 530 decrypts data going both directions and re-encrypts it so that neither honest party can recognize what is going on; meanwhile, Mallory 530 has full access and control over their communications. In fact, Alice 410 and Bob 420 cannot communicate without Mallory 530, because they have different keys ($K_1$ 513 and $K_2$ 523); Alice 410 and Bob 420 can interpret each other's devices as being strangers.

FIG. 6 is a sequence diagram illustrating a use of a shared secret obtained in accordance with various embodiments of the technology to detect the man-in-the-middle attack of FIG. 5. FIG. 6 continues from the scenario of FIG. 5—in which Alice 410 has the key $K_1=g^{ax}$ 513, Bob 420 has the key $K_2=g^{bx}$ 523, and Mallory 530 possesses both keys 534—but with the addition of a shared secret S 604 obtained by Alice 410 and Bob 420 in accordance with various embodiments of the technology as described herein. Alice 410 and Bob 420 each additionally pick a number used once (a "nonce") $n_A$ 615 and $n_B$ 625, respectively. The two honest parties send each other confirmation packets where each party's packet is encrypted with its key ($K_1$ 513 or $K_2$ 523), its nonce 615 or 625, and the secret S 604 (which is not broadcast) in messages 616 and 626. (The hashed values in the example confirmation messages 616 and 626, where the notation "H(X)" in FIG. 6 indicates a hash of a value X, are to prevent replay, mirroring, and dictionary attacks.) They do not share their respective nonces 615 and 625 until both parties have received the confirmation packets sent in messages 616 and 626, so neither Alice 410 nor Bob 420 (nor the man-in-the-middle attacker Mallory 530) can decrypt the confirmation packets until after both messages have been exchanged. Mallory cannot decrypt either confirmation packet without the relevant nonce 615 or 625, and cannot fake or extract the secret S 604 to create new fake messages. Mallory 530 either does not deliver the message 616 to Bob 420 and the message 626 to Alice 410 (halting the communication and destroying the man-in-the-middle attack) or forwards them unaltered to their respective intended recipients.

FIG. 6 illustrates the result if Mallory 530 forwards messages 616 and 626 unaltered, as shown by messages 635 and 636, respectively. In a message 617, Alice 410 transmits her nonce $n_A$ 615, and in a message 627, Bob 420 transmits his nonce $n_B$ 625. As with the confirmation packets, Mallory 530 reveals herself if she does not forward messages 617 and 627 containing the nonces 615 and 625. Once the nonces are delivered in messages 637 and 638, Alice 410 and Bob 420 can see that they have different keys ($K_1$ 513 and $K_2$ 523) and therefore can detect the man-in-the-middle Mallory 530.

If, in contrast to preventing Alice 410 and Bob 420 from using the same key as described in FIG. 5 above, Mallory 530 allows Alice 410 and Bob 420 to use the same key K, then Alice 410 and Bob 420 can establish a direct connection. With the addition of a secret S 604 (e.g., by multiplying the key by the secret, generating a new key by hashing the old key concatenated with the secret, or re-encrypting the encrypted communication stream a second time using the secret), Alice 410 and Bob 420 can communicate freely and the man-in-the middle Mallory 530 will be unable to hide or decrypt communications even if she has the same key K used by Alice 410 and Bob 420 and can handle the encrypted messages.

Figure 7:
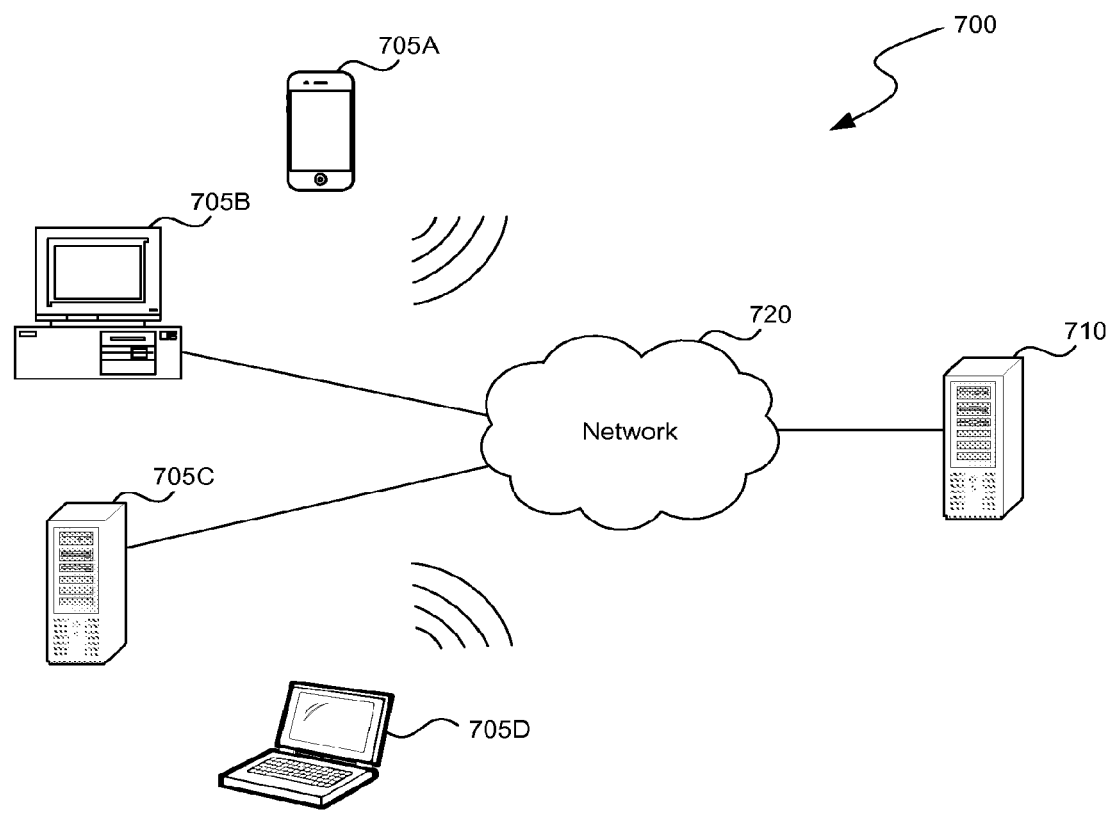
FIG. 7 is a block diagram illustrating an overview of an environment and devices on which some embodiments of the technology may operate.

FIG. 7 is a block diagram illustrating an overview of an environment 700 and devices on which some embodiments of the current application may operate. A system for implementing the technology may include one or more computing systems and devices 705A-D, further described in connection with FIG. 8. The computing systems and devices 705A-D may be referred to herein as the computing device 705. The computing device 705 is illustrated operating in a networked environment using logical connections to one or more remote computers, e.g., a datacenter computing system 710, through a network 720. The network 720 can be a local area network or a wide area network, the Internet, and/or other wired or wireless networks.

Figure 8:
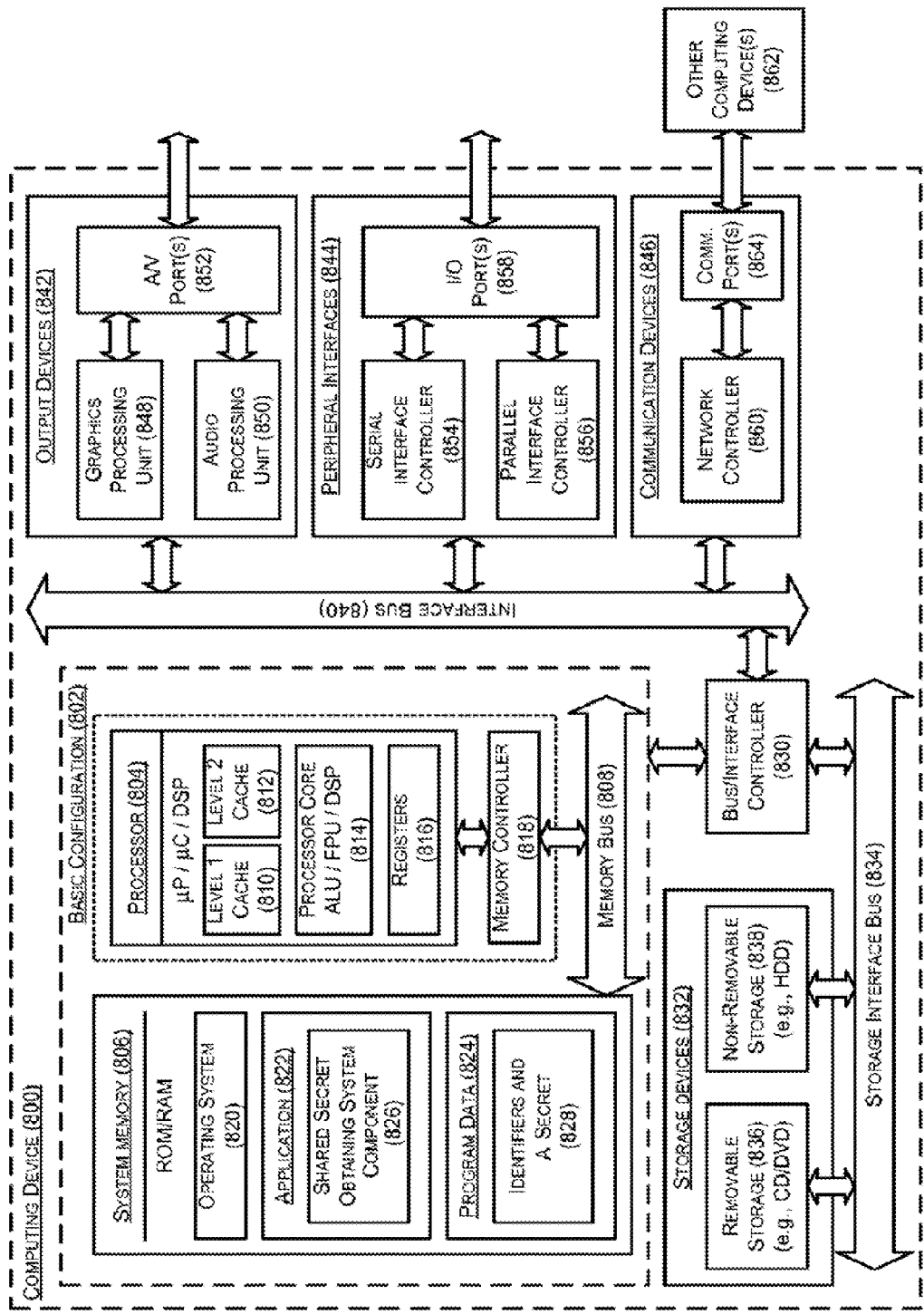
FIG. 8 is a block diagram of an illustrative embodiment of a computing device that is arranged in accordance with at least some embodiments of the present disclosure.

FIG. 8 is a block diagram illustrating an example computing device 800 that is arranged in accordance with at least some embodiments of the present disclosure. In a very basic configuration 802, the computing device 800 typically includes one or more processors 804 and a system memory 806. A memory bus 808 may be used for communicating between the processor 804 and the system memory 806.

Depending on the desired configuration, the processor 804 may be of any type including but not limited to a microprocessor (μP), a microcontroller (μC), a digital signal processor (DSP), or any combination thereof. The processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, one or more applications 822, and program data 824. An application 822 may include a shared secret obtaining system component 826 that is arranged to generate, share, and compare identifiers and receive and maintain the secrecy of a secret. The program data 824 may include identifiers and a secret 828 (e.g., a session ID, a user ID, a third party identifier, and a secret), as is described herein. In some embodiments, the application 822 may be arranged to operate with the program data 824 on the operating system 820 to support data encryption for use in secure communication. This described basic configuration 802 is illustrated in FIG. 8 by those components within the inner dashed line.

The computing device 800 may have additional features or functionality, and additional interfaces to facilitate communications between the basic configuration 802 and any required devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and non-volatile, removable and non-removable media implemented in any method or technology for storage of information, such as computer readable instructions, data structures, program modules, or other data.

The system memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

The computing device 800 may also include an interface bus 840 for facilitating communication from various interface devices (e.g., output devices 842, peripheral interfaces 844, and communication devices 846) to the basic configuration 802 via the bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., a keyboard, a mouse, a pen, a voice input device, a touch input device, etc.) or other peripheral devices (e.g., a printer, a scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media. The term computer readable storage media as used herein does not include communication media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 800 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Although the subject matter has been described in language specific to structural features and/or methodological routines, it is to be understood that the subject matter defined in the appended claims is not necessarily limited to the specific features or routines described above. Rather, the specific features and routines described above are disclosed as example forms of implementing the claims. Accordingly, the invention is not limited except as by the appended claims.

I claim:

1. A method to establish cryptographically secure communication between a first party and a second party, the first party and the second party being separate computing devices, the method comprising:
   generating, by the first party, a session identifier;
   coordinating, by at least the first party, use of the session identifier by the first party and the second party;
   finding, by the first party, an available secure communication channel to a third party, wherein the third party is a datacenter computing system;
   transmitting, by the first party, the session identifier to the third party via the available secure communication channel;
   receiving, by the first party, via the available secure communication channel, a third party identifier and a session identifier-specific secret from the third party;
   sharing, by the first party, information about the received third party identifier with the second party;
   determining, by the first party, that the third party identifier received by the first party matches a third party identifier received by the second party; and
   generating a cryptographic key to secure communication between the first party and the second party using the session identifier-specific secret received with the matching third-party identifier.

2. The method of claim 1, wherein the finding an available secure communication channel to a third party comprises querying an application programming interface.

3. The method of claim 1, wherein the finding an available secure communication channel to a third party comprises identifying an application service that accepts messages directed to the third party.

4. The method of claim 3, wherein the application service comprises an Android™ operating system Intents object to enable a first Android™ component to request functionality from a second Android™ component.

5. The method of claim 1, wherein the transmitting the session identifier to the third party comprises transmitting an identifier of the first party to the third party.

6. The method of claim 1, wherein the receiving of the third party identifier and identifier-specific secret occurs one or two times.

7. The method of claim 1, wherein the generated cryptographic key is to authenticate communication between the first party and the second party.

8. A method performed by a computing device, comprising:
   establishing, by a first entity operating at the computing device, a session identifier shared by the first entity and a second entity that are each configured to exchange cryptographically secure messages with one or more third entities;
   providing, by the first entity, the session identifier to one or more of the third entities;
   receiving, by the first entity, from one of the one or more third entities, a third entity identifier and a secret in response to the session identifier;
   determining, by the first entity, that the third entity identifier received by the first entity matches a third entity identifier received by the second entity;
   generating, by the first entity, an encryption key using the secret received with the matching third entity identifier; and
   encrypting, by the first entity, with the encryption key, communication between the first entity and the second entity.

9. The method of claim 8, wherein the second entity is a user.

10. The method of claim 8, wherein the second entity is a merchant.

11. The method of claim 8, wherein the second entity is an application.

12. The method of claim 11, wherein the first entity and the second entity operate at the same computing device.

13. The method of claim 8, wherein the cryptographic key is a symmetric key.

14. The method of claim 8, wherein the generating an encryption key using the secret comprises applying a cryptographic key derivation function to the secret.

15. A method performed by a first entity in a computing system, the first entity having a secure connection to a datacenter computing system, to establish a secure communication channel with a second entity in the computing system, the second entity having a secure connection to the datacenter computing system, comprising:
   reading, by the first entity, a set of datacenter properties from the datacenter computing system;
   generating, by the first entity, a datacenter identifier and a secret based on the read set of datacenter properties;
   receiving, by the first entity, an identifier from the second entity;
   comparing, by the first entity, the generated datacenter identifier with the identifier received from the second entity;
   determining, by the first entity, that the generated datacenter identifier matches the identifier received from the second entity; and
   establishing, by the first entity, a secure communication channel with the second entity using the secret generated with the datacenter identifier.

16. The method of claim 15, wherein the read set of datacenter properties comprises datacenter address information.

17. The method of claim 15, wherein the read set of datacenter properties comprises datacenter state information.

18. The method of claim 15, wherein the read set of datacenter properties comprises results of datacenter API tests.

19. The method of claim 15, wherein the generating of the datacenter identifier and a secret comprises applying a first cryptographic hash function to the read set of datacenter properties to generate the datacenter identifier and applying a second cryptographic hash function to the read set of datacenter properties to generate the secret.

20. The method of claim 15, wherein the establishing of a secure communication channel comprises exchanging increasingly complex keys until a desired bit depth of security is reached.

21. The method of claim 15, wherein the cryptographic key is a symmetric key.

22. A system to securely provide a secret to a first party and a second party, the first party and the second party being separate computing devices, the system comprising:
- a processor and memory;
- a secret-providing component that, in response to receiving a session identifier via a first secure connection,
  - generates by the processor a secret-providing component identifier and a session identifier-specific secret, and
  - returns the secret-providing component identifier and the session identifier-specific secret via the first secure connection;
- a first secret-requesting component, associated with the first party, that:
  - generates a session identifier in coordination with a second secret-requesting component,
  - sends the session identifier to the secret-providing component via a second secure connection,
  - receives a secret-providing component identifier and a session identifier-specific secret via the second secure connection in return, and
  - determines that the secret-providing component identifier received by the first secret-requesting component matches a secret-providing component identifier received by the second secret-requesting component; and
- a second secret-requesting component, associated with the second party, that:
  - generates a session identifier in coordination with the first secret-requesting component,
  - sends the session identifier to the secret-providing component via a third secure connection,
  - receives a secret-providing component identifier and a session identifier-specific secret via the third secure connection in return, and
  - determines that the secret-providing component identifier received by the second secret-requesting component matches a secret-providing component identifier received by the first secret-requesting component.

23. The system of claim 22, wherein the secret-providing component provides the session identifier-specific secret no more than twice in response to a particular session identifier.

24. The system of claim 22, wherein:
- each of the first secret-requesting component and the second secret-requesting component generates a user identifier and sends its user identifier to the secret-providing component together with the session identifier via a secure connection; and
- the secret-providing component responds only to a pair of a session identifier and a user identifier and provides the session identifier-specific secret no more than once in response to a particular user identifier.

* * * * *